(12) United States Patent
Taranekar et al.

(10) Patent No.: US 11,390,762 B2
(45) Date of Patent: Jul. 19, 2022

(54) TRI-CARBOXYLIC COMPOUNDS AS LOW-VOC COALESCING AGENTS AND PLASTICIZING AGENTS

(71) Applicant: Ascend Performance Materials Operations LLC, Houston, TX (US)

(72) Inventors: Prasad Taranekar, Pearland, TX (US); Jeffery W. Balko, Annapolis, MD (US)

(73) Assignee: Ascend Performance Materials Operation LLC, Houston, TX (US)

(*) Notice: Subject to any disclaimer, the term of this patent is extended or adjusted under 35 U.S.C. 154(b) by 553 days.

(21) Appl. No.: 16/090,048

(22) PCT Filed: Mar. 28, 2017

(86) PCT No.: PCT/US2017/024516
§ 371 (c)(1),
(2) Date: Sep. 28, 2018

(87) PCT Pub. No.: WO2017/176504
PCT Pub. Date: Oct. 12, 2017

(65) Prior Publication Data
US 2020/0339826 A1 Oct. 29, 2020

Related U.S. Application Data

(60) Provisional application No. 62/319,717, filed on Apr. 7, 2016.

(51) Int. Cl.
| C08K 5/11 | (2006.01) |
| C09D 7/63 | (2018.01) |
| C09D 5/02 | (2006.01) |

(52) U.S. Cl.
CPC .............. *C09D 7/63* (2018.01); *C09D 5/022* (2013.01); *C08K 5/11* (2013.01)

(58) Field of Classification Search
None
See application file for complete search history.

(56) References Cited

U.S. PATENT DOCUMENTS

| 4,552,885 | A | * | 11/1985 | Gabriele | .................. | C09D 5/14 |
| | | | | | | 514/315 |
| 5,142,001 | A | * | 8/1992 | Yasuda | .............. | C08G 18/0819 |
| | | | | | | 525/453 |
| 5,508,340 | A | * | 4/1996 | Hart | ................... | C08G 18/4263 |
| | | | | | | 524/591 |
| 8,444,758 | B2 | * | 5/2013 | Stockl | ..................... | C08L 93/04 |
| | | | | | | 106/218 |
| 10,875,981 | B2 | * | 12/2020 | Woldt | ..................... | C07C 67/08 |
| 2005/0054812 | A1 | * | 3/2005 | Wagner | .................. | C08G 63/06 |
| | | | | | | 528/272 |
| 2009/0149591 | A1 | * | 6/2009 | Yang | ..................... | C09D 5/024 |
| | | | | | | 524/418 |
| 2009/0326121 | A1 | * | 12/2009 | Stockl | ..................... | C09D 7/20 |
| | | | | | | 524/287 |
| 2011/0028625 | A1 | | 2/2011 | Tansey | | |
| 2011/0218285 | A1 | * | 9/2011 | Stockl | ................. | C09D 193/04 |
| | | | | | | 524/308 |
| 2012/0095145 | A1 | | 4/2012 | Zhou et al. | | |
| 2014/0031470 | A1 | | 1/2014 | Busche et al. | | |
| 2018/0319954 | A1 | * | 11/2018 | Woldt | ..................... | C07C 67/08 |
| 2020/0269211 | A1 | * | 8/2020 | Serre | ................. | B01J 20/28054 |

FOREIGN PATENT DOCUMENTS

| EP | 0026982 A1 | 4/1981 |
| EP | 2247566 A2 | 11/2010 |
| EP | 2471881 A1 | 7/2012 |
| EP | 2721100 A1 | 4/2014 |
| JP | H04342748 A | 11/1992 |
| JP | H0812808 A | 1/1996 |
| JP | 2003277688 A | 10/2003 |
| WO | 01/51543 A2 | 7/2001 |
| WO | 2008054277 A1 | 5/2008 |
| WO | 2009097142 A1 | 8/2009 |
| WO | 2012054317 A1 | 4/2012 |
| WO | 2012173679 A1 | 12/2012 |
| WO | 2017137734 A1 | 8/2017 |

OTHER PUBLICATIONS

International Search Report issued in corresponding International Patent Application No. PCT/US2017/024516 dated Jun. 20, 2017.
Written Opinion issued in corresponding International Patent Application No. PCT/US2017/024516 dated Jun. 20, 2017.

* cited by examiner

*Primary Examiner* — Vu A Nguyen
(74) *Attorney, Agent, or Firm* — Cozen O'Connor

(57) ABSTRACT

A tri-carboxylic compound of Formula (IA) optionally in combination with a compound of Formula (IIA) behaves as a low-VOC, low odor coalescing agent, while a tri-carboxylic compound of Formula (IA) in combination with a compound of Formula (IIB), or alternatively, a tri-carboxylic compound of Formula (IB) in combination with a compound of Formula (IIA) exhibits dual coalescing and plasticizing properties. A tri-carboxylic compound of Formula (IB) optionally in combination with a compound of Formula (IIB) behaves as low-VOC, low odor plasticizing agent.

9 Claims, No Drawings

TRI-CARBOXYLIC COMPOUNDS AS LOW-VOC COALESCING AGENTS AND PLASTICIZING AGENTS

BACKGROUND OF THE INVENTION

Coalescing agents are high boiling point (i.e., slow to evaporate) solvents employed to lower the minimum film formation temperature (MFFT) of products such as paints, inks, adhesives, toners, sealants, stains, glazes, primers, carpet backings and other coating compositions. Coalescing agents are distinguishable from nonvolatile plasticizing agents that are employed to increase the plasticity or fluidity of a material. In latex emulsion paints, a coalescing agent can serve as a temporary plasticizer to reduce the glass transition temperature ($T_g$) of the latex below that of the drying temperature so as to achieve adequate film formation for the purpose of avoiding problems such as cracking, poor color development, low gloss and poor weather resistance.

As volatile coalescing agents evaporate out of a film, the film becomes harder due to the return of the latex to its original $T_g$. In view of the adverse impact of various volatile organic compounds on human health and the environment, the use of coalescing agents with a high volatile organic content ("VOC"), especially those defined as having 100% VOC, is undesirable. Such coalescing agents are also subject to odor and quick-drying issues and may be noncompliant with current VOC regulations in selected jurisdictions. (Summary of State and Federal VOC for Institutional and Consumer Products 2015, http://www.issa.com/data/moxiestorage/regulatory_education/voc_limits_summary_8-12-15.pdf).

Coalescing agents are often considered as fugitive plasticizers, which means that in addition to their chief function as film-formers, these agents also aid in temporarily lowering the $T_g$ of coating water-based resin binders, especially at lower temperatures such as 40° F. where polymers present in the binders can stiffen and crack. The coalescing agents therefore maintain the flexibility of the polymers by acting as pseudo-plasticizers until ambient temperatures return, at which point the coalescing agents evaporate out, rendering the film harder. Therefore, the term "plasticizer" is often loosely used when applied to coalescing agents in coatings. However, true plasticizers are more commonly used in PVC plastic resins or softer coatings to create flexible objects or films. Such plasticizers generally contain a higher number of carbons (i.e., possess a higher molecular weight) and include aliphatic compounds such as dioctyl sebacate, dioctyl adipate and aromatic types based on phthalic esters such as dibutyl phthalate, dioctyl phthalate, trioctyl trimellitate and the like. These plasticizers function to provide long term flexibility or plasticization which is significantly different from the film forming effects of coalescing agents. Several higher molecular weight compounds such as Eastman's Optifilm™ 400 which functions both as a coalescing agent and plasticizer are often classified as "zero-VOC". Optifilm™ 400 does not evaporate and thus creates permanent softness, potentially resulting in poor block and print resistant coatings, especially at higher concentrations. Another example appears in Japanese Patent Application H04-342748 which describes tri-carboxylic esters plasticizers for halogen-containing plastics (such as PVC) as flexible plasticizers which remain in the resin and are therefore considered zero-VOC. In contrast, the present invention includes the use of tri-carboxylic esters as "low-VOC" compounds that perform as coalescing agents which eventually evaporate out from a coating composition.

Low-VOC coalescing agents generally have 50% less VOC than 100% VOC coalescing agents and include Flexi-Solv® Diisobutyl DBE, Coasol® 290 and Oxfilm® 351. Exemplary "zero-VOC" or "extremely low-VOC" coalescing agents include Myrifilm® (Myriant) and Loxanol® CA 120 (BASF).

It is an object of the present invention to provide low odor and low-VOC coalescing agents, compounds that function both as coalescing agents and plasticizing agents, and compounds that function as plasticizing agents to meet present and predictably stricter future VOC regulatory requirements and to provide superior film hardness and block and scrub resistance for paints, inks and other coating compositions.

SUMMARY OF THE INVENTION

An aspect of the present invention is a low-VOC and low-odor coalescing composition comprising:
a compound of Formula (IA)

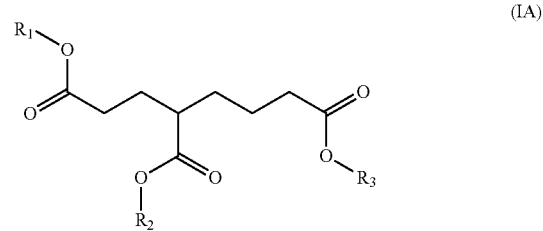

(IA)

or a salt thereof,
wherein:
$R_1$, $R_2$ and $R_3$ are each independently H, $C_1$-$C_6$ alkyl, $C_3$-$C_7$ heterocyclic, a glycol ether, aryl, $C_1$-$C_3$ alkyl-aryl and aryl-$C_1$-$C_3$ alkyl, where each of these groups is optionally substituted with one or more selected from the group consisting of hydroxy, $C_1$-$C_6$ ether and $C_1$-$C_6$ alkyl, and
at least one of $R_1$, $R_2$ and $R_3$ is $C_1$-$C_6$ alkyl, $C_3$-$C_7$ heterocyclic, a glycol ether, aryl, $C_1$-$C_3$ alkyl-aryl or aryl-$C_1$-$C_3$ alkyl;
and a compound of Formula (IIA)

$R_4$—OOC—X—COO—$R_5$ (IIA)

or a salt thereof,
wherein:
$R_4$ and $R_5$ are each independently H or $C_1$-$C_6$ alkyl optionally substituted with one or more selected from the group consisting of hydroxy, $C_1$-$C_6$ ether and $C_1$-$C_6$ alkyl; and
X is —($CH_2$)$_2$—, —($CH_2$)$_3$— or —($CH_2$)$_4$—.

In an exemplary embodiment of the invention, $R_1$, $R_2$ and $R_3$ are each independently selected from the group consisting of methyl, ethyl, propyl, isopropyl, butyl, isobutyl, pentyl, isopentyl and hexyl.

In an exemplary embodiment of the invention, $R_1$, $R_2$ and $R_3$ are each methyl, or each ethyl, or each propyl, or each isopropyl, or each butyl, or each isobutyl, or each pentyl, or each isopentyl, or each hexyl, or mixtures thereof.

In an exemplary embodiment, one of $R_1$, $R_2$ and $R_3$ is H and the remaining two of $R_1$, $R_2$ and $R_3$ are methyl, or ethyl, or propyl, or isopropyl, or butyl, or isobutyl, or pentyl, or isopentyl, or hexyl, or mixtures thereof.

In an exemplary embodiment, two of $R_1$, $R_2$ and $R_3$ are H and the remaining one of $R_1$, $R_2$ and $R_3$ is methyl, or ethyl, or propyl, or isopropyl, or butyl, or isobutyl, or pentyl, or isopentyl, or hexyl.

In an exemplary embodiment of the invention, at least two of $R_1$, $R_2$ and $R_3$ are methyl, or ethyl, or propyl, or isopropyl, or butyl, or isobutyl, or pentyl, or isopentyl, or hexyl, or mixtures thereof.

In an exemplary embodiment of the invention, at least one of $R_1$, $R_2$ and $R_3$ is methyl, or ethyl, or propyl, or isopropyl, or butyl, or isobutyl, or pentyl, or isopentyl, or hexyl.

In an exemplary embodiment of the invention, $R_4$ and $R_5$ are each independently selected from the group consisting of hydrogen, methyl, ethyl, propyl, isopropyl, butyl, isobutyl, pentyl, isopentyl and hexyl.

In an exemplary embodiment of the invention, both $R_4$, and $R_5$ are methyl, or ethyl, or propyl, or isopropyl, or butyl, or isobutyl, or pentyl, or isopentyl, or hexyl, or mixtures thereof.

In an exemplary embodiment of the invention, at least one of $R_4$ and $R_5$ is methyl, or ethyl, or propyl, or isopropyl, or butyl, or isobutyl, or pentyl, or isopentyl, or hexyl.

In an exemplary embodiment of the invention, one of $R_4$ and $R_5$ is H and the remaining $R_4$ or $R_5$ is methyl, or ethyl, or propyl, or isopropyl, or butyl, or isobutyl, or pentyl, or isopentyl, or hexyl.

In an exemplary embodiment of the invention, $R_4$ and $R_5$ are each H.

In an exemplary embodiment of the invention, X is —$(CH_2)_2$—.

In an exemplary embodiment of the invention, X is —$(CH_2)_3$—.

In an exemplary embodiment of the invention, X is —$(CH_2)_4$—.

An aspect of the present invention is a low-VOC and low-odor coalescing composition comprising a compound of Formula (IA), wherein $R_1$, $R_2$ and $R_3$ are each butyl.

An aspect of the present invention is a low-VOC and low-odor coalescing composition consisting of a compound of Formula (IA), wherein $R_1$, $R_2$ and $R_3$ are each butyl.

An aspect of the invention is a low-VOC and low-odor coalescing composition comprising a compound of Formula (IA), wherein $R_1$, $R_2$ and $R_3$ are each isobutyl.

An aspect of the invention is a low-VOC and low-odor coalescing composition consisting of a compound of Formula (IA), wherein $R_1$, $R_2$ and $R_3$ are each isobutyl.

An aspect of the present invention is a low-VOC and low-odor coalescing and plasticizing composition comprising:
a compound of Formula (IA)

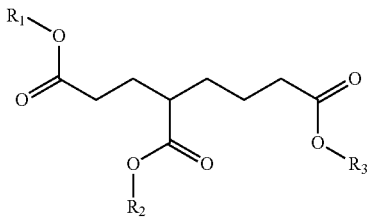

(IA)

or a salt thereof,
wherein:
$R_1$, $R_2$ and $R_3$ are each independently H, $C_1$–$C_6$ alkyl, $C_3$-$C_7$ heterocyclic, a glycol ether, aryl, $C_1$-$C_3$ alkyl-aryl and aryl-$C_1$-$C_3$ alkyl, where each of these groups is optionally substituted with one or more selected from the group consisting of hydroxy, $C_1$-$C_6$ ether and $C_1$-$C_6$ alkyl, and at least one of $R_1$, $R_2$ and $R_3$ is $C_1$-$C_6$ alkyl, $C_3$-$C_7$ heterocyclic, a glycol ether, aryl, $C_1$-$C_3$ alkyl-aryl or aryl-$C_1$-$C_3$ alkyl;

and a compound of Formula (IIB)

$$R_6\text{—OOC—X—COO—}R_7 \tag{IIB}$$

or a salt thereof,
wherein:
$R_6$ and $R_7$ are each independently $C_7$-$C_{20}$ alkyl optionally substituted with one or more selected from the group consisting of hydroxy, $C_1$-$C_6$ ether and $C_1$-$C_6$ alkyl; and
X is —$(CH_2)_2$—, —$(CH_2)_3$— or —$(CH_2)_4$—.

In an exemplary embodiment of the invention, $R_6$ and $R_7$ are each independently selected from the group consisting of heptyl, octyl, nonyl, decyl, undecyl, dodecyl, tridecyl, tetradecyl, pentadecyl, hexadecyl, heptadecyl, octadecyl, nonadecyl and eicosyl.

In an exemplary embodiment of the invention, both $R_6$ and $R_7$ are heptyl, or octyl, or nonyl, or decyl, or undecyl, or dodecyl, or tridecyl, or tetradecyl, or pentadecyl, or hexadecyl, or heptadecyl, or octadecyl, or nonadecyl or eicosyl or mixtures thereof.

In an exemplary embodiment of the invention, at least one of $R_6$ and $R_7$ is heptyl, or octyl, or nonyl, or decyl, or undecyl, or dodecyl, or tridecyl, or tetradecyl, or pentadecyl, or hexadecyl, or heptadecyl, or octadecyl, or nonadecyl or eicosyl.

An aspect of the invention is a low-VOC and low-odor plasticizing and coalescing composition comprising:
a compound of Formula (IB)

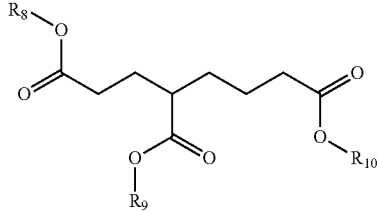

(IB)

or a salt thereof,
wherein:
$R_8$, $R_9$ and $R_{10}$ are each independently $C_7$-$C_{20}$ alkyl optionally substituted with one or more selected from the group consisting of hydroxy, $C_1$-$C_6$ ether and $C_1$-$C_6$ alkyl, and a compound of Formula (IIA)

$$R_4\text{—OOC—X—COO—}R_5 \tag{IIA}$$

or a salt thereof,
wherein:
$R_4$ and $R_5$ are each independently H or $C_1$-$C_6$ alkyl optionally substituted with one or more selected from the group consisting of hydroxy, $C_1$-$C_6$ ether and $C_1$-$C_6$ alkyl; and
X is —$(CH_2)_2$—, —$(CH_2)_3$— or —$(CH_2)_4$—.

In an exemplary embodiment of the invention, $R_8$, $R_9$ and $R_{10}$ are each independently selected from the group consisting of heptyl, octyl, nonyl, decyl, undecyl, dodecyl, tridecyl, tetradecyl, pentadecyl, hexadecyl, heptadecyl, octadecyl, nonadecyl and eicosyl.

In an exemplary embodiment of the invention, $R_8$, $R_9$ and $R_{10}$ are each heptyl, or each octyl, or each nonyl, or each decyl, or each undecyl, or each dodecyl, or each tridecyl, or each tetradecyl, or each pentadecyl, or each hexadecyl, or each heptadecyl, or each octadecyl, or each nonadecyl or each eicosyl or mixtures thereof.

In an exemplary embodiment of the invention, at least two of $R_8$, $R_9$ and $R_{10}$ are heptyl, or octyl, or nonyl, or decyl, or undecyl, or dodecyl, or tridecyl, or tetradecyl, or pentadecyl, or hexadecyl, or heptadecyl, or octadecyl, or nonadecyl or eicosyl or mixtures thereof.

In an exemplary embodiment of the invention, at least one of $R_8$, $R_9$ and $R_{10}$ is heptyl, or octyl, or nonyl, or decyl, or undecyl, or dodecyl, or tridecyl, or tetradecyl, or pentadecyl, or hexadecyl, or heptadecyl, or octadecyl, or nonadecyl or eicosyl.

An aspect of the invention is a low-VOC and low-odor plasticizing composition comprising:
a compound of Formula (IB)

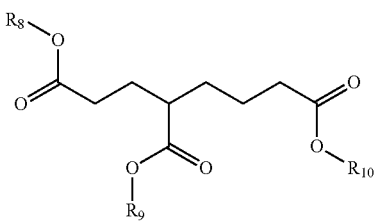

(IB)

or a salt thereof,
wherein:
$R_8$, $R_9$ and $R_{10}$ are each independently $C_7$-$C_{20}$ alkyl optionally substituted with one or more selected from the group consisting of hydroxy, $C_1$-$C_6$ ether and $C_1$-$C_6$ alkyl,
and a compound of Formula (IIB)

$R_6$—OOC—X—COO—$R_7$ (IIB)

or a salt thereof,
wherein:
$R_6$ and $R_7$ are each independently $C_7$-$C_{20}$ alkyl optionally substituted with one or more selected from the group consisting of hydroxy, $C_1$-$C_6$ ether and $C_1$-$C_6$ alkyl; and X is —$(CH_2)_2$—, —$(CH_2)_3$— or —$(CH_2)_4$—.

An aspect of the invention is a method for decreasing VOC and/or odor in a coating composition, comprising adding a coalescing composition comprising a compound of Formula (IA)

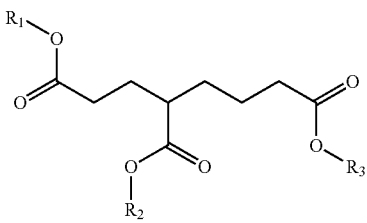

(IA)

or a salt thereof,
wherein:
$R_1$, $R_2$ and $R_3$ are each independently H, $C_1$-$C_6$ alkyl, $C_3$-$C_7$ heterocyclic, a glycol ether, aryl, $C_1$-$C_3$ alkyl-aryl and aryl-$C_1$-$C_3$ alkyl, wherein each of these groups is optionally substituted with one or more selected from the group consisting of hydroxy, $C_1$-$C_6$ ether and $C_1$-$C_6$ alkyl and,
at least one of $R_1$, $R_2$ and $R_3$ is $C_1$-$C_6$ alkyl, $C_3$-$C_7$ heterocyclic, a glycol ether, aryl, $C_1$-$C_3$ alkyl-aryl or aryl-$C_1$-$C_3$ alkyl,
during preparation of the coating composition.

An aspect of the invention is a method for decreasing VOC and/or odor in a coating composition, comprising adding to the coating composition a compound of Formula (IA)

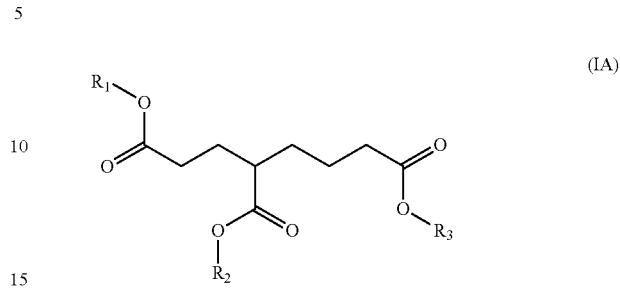

(IA)

or a salt thereof,
wherein:
$R_1$, $R_2$ and $R_3$ are each independently H, $C_1$-$C_6$ alkyl, $C_3$-$C_7$ heterocyclic, a glycol ether, aryl, $C_1$-$C_3$ alkylaryl and aryl-$C_1$-$C_3$ alkyl, wherein each of these groups is optionally substituted with one or more selected from the group consisting of hydroxy, $C_1$-$C_6$ ether and $C_1$-$C_6$ alkyl, and
at least one of $R_1$, $R_2$ and $R_3$ is $C_1$-$C_6$ alkyl, $C_3$-$C_7$ heterocyclic, a glycol ether, aryl, $C_1$-$C_3$ alkyl-aryl or aryl-$C_1$-$C_3$ alkyl,
in combination with a compound of Formula (IIA)

$R_4$—OOC—X—COO—$R_5$ (IIA)

or a salt thereof,
wherein:
$R_4$ and $R_5$ are each independently H or $C_1$-$C_6$ alkyl optionally substituted with one or more selected from the group consisting of hydroxy, $C_1$-$C_6$ ether and $C_1$-$C_6$ alkyl; and X is —$(CH_2)_2$—, —$(CH_2)_3$— or —$(CH_2)_4$—,
during preparation of the coating composition.

In an exemplary embodiment of the invention, the compound of Formula (IA) is HTCE-$R_A$ ($R_1$, $R_2$ and $R_3$ are all methyl) and the compound of Formula (IIA) is DXE-$R_B$ ($R_4$ and $R_5$ are both methyl and X is —$(CH_2)_2$—, —$(CH_2)_3$— or —$(CH_2)_4$—). In another exemplary embodiment, the compound of Formula (IA) is HTCE-$R_Bu$ ($R_1$, $R_2$ and $R_3$ are each n-butyl). In another exemplary embodiment, the compound of Formula (IA) is HTCE-$R_{IBu}$ ($R_1$, $R_2$ and $R_3$ are each isobutyl).

An aspect of the invention is a method for decreasing VOC and/or odor in a coating composition, comprising adding to the coating composition a compound of Formula (IA)

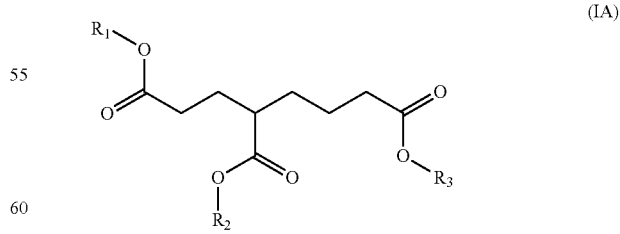

(IA)

or a salt thereof,
wherein:
$R_1$, $R_2$ and $R_3$ are each independently H, $C_1$-$C_6$ alkyl, $C_3$-$C_7$ heterocyclic, a glycol ether, aryl, $C_1$-$C_3$ alkylaryl and aryl-$C_1$-$C_3$ alkyl, wherein each of these groups is optionally substituted with one or more selected from the group consisting of hydroxy, $C_1$-$C_6$ ether and $C_1$-$C_6$ alkyl, and at least one of $R_1$, $R_2$ and $R_3$ is $C_1$-$C_6$ alkyl, $C_3$-$C_7$ heterocyclic, a glycol ether, aryl, $C_1$-$C_3$ alkyl-aryl or aryl-$C_1$-$C_3$ alkyl, in combination with a compound of Formula (IIB)

$$R_6\text{—OOC—X—COO—}R_7 \quad \text{(IIB)}$$

or a salt thereof,
wherein:
$R_6$ and $R_7$ are each independently $C_7$-$C_{20}$ alkyl optionally substituted with one or more selected from the group consisting of hydroxy, $C_1$-$C_6$ ether and $C_1$-$C_6$ alkyl; and
X is —$(CH_2)_2$—, —$(CH_2)_3$— or —$(CH_2)_4$—,
during preparation of the coating composition.

An aspect of the invention is a method for decreasing VOC and/or odor in a coating composition, comprising adding to the coating composition a compound of Formula (IB)

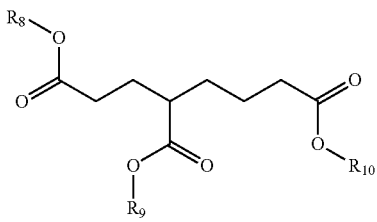

(IB)

or a salt thereof,
wherein:
$R_8$, $R_9$ and $R_{10}$ are each independently $C_7$-$C_{20}$ alkyl optionally substituted with one or more selected from the group consisting of hydroxy, $C_1$-$C_6$ ether and $C_1$-$C_6$ alkyl,
in combination with a compound of Formula (IIA)

$$R_4\text{—OOC—X—COO—}R_5 \quad \text{(IIA)}$$

or a salt thereof,
wherein:
$R_4$ and $R_5$ are each independently H or $C_1$-$C_6$ alkyl optionally substituted with one or more selected from the group consisting of hydroxy, $C_1$-$C_6$ ether and $C_1$-$C_6$ alkyl; and
X is —$(CH_2)_2$—, —$(CH_2)_3$— or —$(CH_2)_4$—,
during preparation of the coating composition.

An aspect of the invention is a method for decreasing VOC and/or odor in a coating composition, comprising adding to the coating composition a compound of Formula (IB)

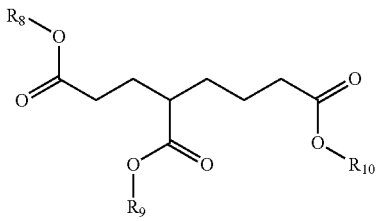

(IB)

or a salt thereof,
wherein:
$R_8$, $R_9$ and $R_{10}$ are each independently $C_7$-$C_{20}$ alkyl optionally substituted with one or more selected from the group consisting of hydroxy, $C_1$-$C_6$ ether and $C_1$-$C_6$ alkyl, in combination with a compound of Formula (IIB)

$$R_6\text{—OOC—X—COO—}R_7 \quad \text{(IIB)}$$

or a salt thereof,
wherein:
$R_6$ and $R_7$ are each independently $C_7$-$C_{20}$ alkyl optionally substituted with one or more selected from the group consisting of hydroxy, $C_1$-$C_6$ ether and $C_1$-$C_6$ alkyl; and
X is —$(CH_2)_2$—, —$(CH_2)_3$— or —$(CH_2)_4$—,
during preparation of the coating composition.

An aspect of the invention is a coating composition comprising:
the low-VOC and low-odor coalescing compound of Formula (IA); and
a binder, a pigment, a pigment extender, a colorant, a tint, a dye, a surfactant (e.g. anionic or nonionic or cationic), a suspension additive, an antifoaming agent, a biocide, a fungicide, a particulate, a cementitious composition, a texturizing composition, a water-miscible solvent, a pH adjuster, a crosslinking agent, a thickening agent, a viscosifier, a filler, a freeze-thaw additive, a flattening additive, a pigment grind additive, an opacifier, a stabilizer, a film preservative or any combination thereof.

An aspect of the invention is a coating composition comprising:
the low-VOC and low-odor coalescing compounds of Formula (IA) and Formula (IIA); and
a binder, a pigment, a pigment extender, a colorant, a tint, a dye, a surfactant (e.g. anionic or nonionic or cationic), a suspension additive, an antifoaming agent, a biocide, a fungicide, a particulate, a cementitious composition, a texturizing composition, a water-miscible solvent, a pH adjuster, a crosslinking agent, a thickening agent, a viscosifier, a filler, a freeze-thaw additive, a flattening additive, a pigment grind additive, an opacifier, a stabilizer, a film preservative or any combination thereof.

An aspect of the invention is a coating composition comprising:
the low-VOC and low-odor coalescing and plasticizing compounds of Formula (IA) and Formula (IIB); and
a binder, a pigment, a pigment extender, a colorant, a tint, a dye, a surfactant (e.g. anionic or nonionic or cationic), a suspension additive, an antifoaming agent, a biocide, a fungicide, a particulate, a cementitious composition, a texturizing composition, a water-miscible solvent, a pH adjuster, a crosslinking agent, a thickening agent, a viscosifier, a filler, a freeze-thaw additive, a flattening additive, a pigment grind additive, an opacifier, a stabilizer, a film preservative or any combination thereof.

An aspect of the invention is a coating composition comprising:
the low-VOC and low-odor coalescing and plasticizing compounds of Formula (IB) and Formula (IIA); and
a binder, a pigment, a pigment extender, a colorant, a tint, a dye, a surfactant (e.g. anionic or nonionic or cationic), a suspension additive, an antifoaming agent, a biocide, a fungicide, a particulate, a cementitious composition, a texturizing composition, a water-miscible solvent, a pH adjuster, a crosslinking agent, a thickening agent, a viscosifier, a filler, a freeze-thaw additive, a flattening additive, a pigment grind additive, an opacifier, a stabilizer, a film preservative or any combination thereof.

An aspect of the invention is a coating composition comprising:
the low-VOC and low-odor plasticizing compounds of Formula (IB) and Formula (IIB); and
a binder, a pigment, a pigment extender, a colorant, a tint, a dye, a surfactant (e.g. anionic or nonionic or cationic), a suspension additive, an antifoaming agent, a biocide, a fungicide, a particulate, a cementitious composition, a texturizing composition, a water-miscible solvent, a pH adjuster, a crosslinking agent, a thickening agent, a viscosifier, a filler, a freeze-thaw additive, a flattening additive, a pigment grind additive, an opacifier, a stabilizer, a film preservative or any combination thereof.

In an aspect of the invention, any of the coating compositions of the invention may further comprise another coalescing compound or composition, such as a conventional and/or commercial coalescing composition or compound.

In an exemplary embodiment, the ratio of Formula (IA) to Formula (IIA); or the ratio of Formula (IA) to Formula (IIB); or the ratio of Formula (IB) to Formula (IIA); or the ratio of Formula (IB) to Formula (IIB) independently ranges from 1:9 to 9:1 by weight, which includes, but is not limited to, ratios of 1:8, 1:7, 1:6, 1:5, 1:4, 1:3, 1:2, 1:1, 2:1, 3:1, 4:1, 5:1, 6:1, 7:1 and 8:1.

In an exemplary embodiment, the conventional and/or commercial coalescing agent is one or more of Myrifilm®, VELTA® 262, VELTA® 368, TEXANOL™ UCAR™ Filmer IBT (Dow) and DALPAD™ (Dow).

In an exemplary embodiment, the coating composition is a paint, ink, adhesive, toner, sealant, stain, glaze, primer or carpet backing. The compositions of the present invention are also suitable for PVC applications (e.g., plastisols, sheets, pipes, toys, medical devices and packaging films (e.g., blood bags)).

In an exemplary embodiment, the coating composition is a latex paint composition.

In an aspect of the invention, any of the coating compositions of the invention may further comprise another plasticizing compound or composition, such as a conventional and/or commercial plasticizing composition or compound.

In an exemplary embodiment, the conventional and/or commercial plasticizing agent is one or more of Optifilm™ 400 (Eastman), Myrifilm© (Myriant), Oxifilm 351 (Oxea), UCAR™ Filmer IBT (Dow) and DALPAD™ (Dow).

An aspect of the invention is a method of reducing the minimum film formation temperature (MFFT) of a coating composition comprising adding to the coating composition the low-VOC and low-odor coalescing compound of Formula (IA).

An aspect of the invention is a method of reducing the minimum film formation temperature of a coating composition comprising adding to the coating composition the low-VOC and low-odor coalescing compound of Formula (IA) and Formula (IIA).

An aspect of the invention is a method of reducing the minimum film formation temperature of a coating composition comprising adding to the coating composition the low-VOC and low-odor coalescing and plasticizing compounds of Formula (IA) and Formula (IIB).

An aspect of the invention is a method of reducing the minimum film formation temperature of a coating composition comprising adding to the coating composition the low-VOC and low-odor coalescing and plasticizing compounds of Formula (IB) and Formula (IIA).

An aspect of the invention is a method of reducing the minimum film formation temperature of a coating composition comprising adding to the coating composition the low-VOC and low-odor plasticizing compounds of Formula (IB) and Formula (IIB).

DETAILED DESCRIPTION OF INVENTION

The coalescing, plasticizing, and dual coalescing/plasticizing compositions of the invention as represented by a compound of Formula (IA), and combinations of a compound of Formula (IA) or (IB) with a compound of Formula (IIA) or (IIB) are suitable for paints, coatings, inks, and adhesive compositions. The coalescing agents of the invention alone or in combination with other known coalescing agents exhibit a VOC of no greater than 300 g/L, such as no greater than 250 g/L (about 25% w/v), such as no greater than 200 g/L, such as no greater than 150 g/L, such as no greater than 100 g/L, such as no greater than 80 g/L, such as no greater than 70 g/L, such as no greater than 60 g/L such as no greater than 50 g/L (about 5% w/v), such as no greater than 40 g/L which results in a high gloss or semi-gloss or matt finish with strong block, print resistance and good dry time properties at low application temperatures and without an accompanying undesirable odor.

In general, coalescents (also known as coalescence or coalescing aids, agents, compositions or solvents) function as film forming assistants and act to bring together polymeric components present in latex paints, adhesives and other coating compositions. The low-VOC coalescing agents of the present invention have boiling points above about 2000° C., such as above about 2500° C., such as above about 300° C., which meets the classification requirements of "VOC-free" in accordance with the European Union regulations 1999/42/EC and 2004/42 and "low-VOC" as defined by the United States Environmental Protection Agency method 24 (EPA 24).

The term "substituted", as used herein, refers to the replacement of at least one hydrogen atom of a molecular arrangement with a substituent. In the case of an oxo substituent ("=O"), two hydrogen atoms are replaced. When substituted, one or more of the groups below are "substituents." Substituents include, but are not limited to, alkyl, alkoxy, alkylthio, aryl, aryl-alkyl, alkyl-aryl, heteroaryl, heteroarylalkyl, heterocyclyl, hydroxy and heterocycloalkyl, as well as, —NRaRb, —NRaC(O)Rb, —NRaC(O)NRaNRb, —NRaC(=O)ORb, NRaSO$_2$Rb, —C(=O)Ra, —C(=O)ORa, —C(=O)NRaRb, —OC(=O)NRaRb, —ORa, —SRa, —SORa, S(=O)$_2$Ra, —OS(=O)$_2$Ra and —S(=O)ORa. In addition, the above substituents may be further substituted with one or more of the above substituents, such that the substituent comprises, for example, a substituted alkyl, substituted aryl, substituted aryl-alkyl, substituted alkyl-aryl, substituted heterocycle, or substituted heterocycloalkyl. Ra and Rb in this context may be the same or different and are, independently, hydrogen, alkyl, haloalkyl, substituted alkyl, aryl, substituted aryl, arylalkyl and substituted arylalkyl, heterocyclyl, substituted heterocyclyl, heterocycloalkyl or substituted heterocycloalkyl.

The term "alkyl", as used herein, refers to any straight chain or branched, non-cyclic or cyclic, unsaturated or saturated aliphatic hydrocarbon containing from 1 to 10 carbon atoms, while the term "lower alkyl" has the same meaning as alkyl but contains from 1 to 6 carbon atoms. The term "higher alkyl" has the same meaning as alkyl but contains from 7 to 10 carbon atoms. Representative saturated straight chain alkyls include, but are not limited to, methyl, ethyl, n-propyl, n-butyl, n-pentyl, n-hexyl, n-heptyl, n-octyl, n-nonyl, and the like; while saturated branched alkyls include, but are not limited to, isopropyl, sec-butyl, isobutyl, tert-butyl, isopentyl, and the like. As referred to herein, a listing of $C_1$-$C_x$ alkyl is intended to include each and every species encompassed within the range of $C_1$ to C. Thus, $C_1$-$C_6$ alkyl is intended to include one or more of methyl, ethyl, propyl, butyl, isopropyl, isobutyl, pentyl and hexyl. As an example, $C_1$-$C_6$ alkyl is intended to encompass narrower ranges such as $C_1$-$C_5$, $C_1$-$C_4$, $C_1$-$C_3$, $C_2$-$C_5$, $C_2$-$C_4$, $C_2$-$C_3$, etc. Cyclic alkyls may be obtained by joining two alkyl groups bound to the same atom or by joining two alkyl groups each bound to adjoining atoms. Representative saturated cyclic alkyls include, but are not limited to, cyclopropyl, cyclobutyl, cyclopentyl, cyclohexyl, and the like; while unsaturated cyclic alkyls include, but are not limited to, cyclopentenyl and cyclohexenyl, and the like. Cyclic alkyls are also referred to herein as a "homocycles" or "homocyclic rings." Unsaturated alkyls contain at least one double or triple bond between adjacent carbon atoms (referred to as an "alkenyl" or "alkynyl", respectively). Representative straight chain and branched alkenyls include, but are not limited to, ethylenyl, propylenyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like; while representative straight chain and branched alkynyls include, but are not limited to, acetylenyl, propynyl, 1-butynyl, 2-butynyl, 1-pentynyl, 2-pentynyl, 3-methyl-1-butynyl, and the like.

The term "aryl", as used herein, refers to any aromatic carbocyclic moiety such as, but not limited to, phenyl or naphthyl.

The term "alkyl-aryl" as used herein, refers to any alkyl having at least one alkyl hydrogen atom replaced with an aryl moiety, such as, but not limited to, benzyl, —$(CH_2)_2$-phenyl, —$(CH_2)_3$-phenyl, —$CH(phenyl)_2$, and the like. The term "aryl-alkyl" refers to any aryl having at least one aryl hydrogen replaced with an alkyl moiety and includes, but is not limited to, $C_6H_4$—$CH_3$ and $C_6H_3$—$(CH_3)(CH_2CH_2CH_3)$.

The term "heterocycle" or "heterocyclic ring" or "heterocyclic", as used herein, refers to any 3- to 7-membered monocyclic, or 7- to 10-membered bicyclic, heterocyclic ring which is either saturated, unsaturated, or aromatic, and which contains from 1 to 4 heteroatoms independently selected from nitrogen, oxygen and sulfur, and wherein the nitrogen and sulfur heteroatoms may be optionally oxidized, and the nitrogen heteroatom may be optionally quaternized, including bicyclic rings in which any of the above heterocycles are fused to a benzene ring. The heterocycle may be attached via any heteroatom or carbon atom. Heterocycles may include heteroaryls exemplified by, but not limited to, pyridine, purine, pyrimidine, furan, thiophene and pyrrole. Thus, in addition to the heteroaryls listed above, heterocycles may also include, but are not limited to, morpholinyl, pyrrolidinonyl, pyrrolidinyl, piperidinyl, hydantoinyl, valerolactamyl, oxiranyl, oxetanyl, tetrahydrofuranyl, tetrahydropyranyl, tetrahydropyridinyl, tetrahydroprimidinyl, tetrahydrothiophenyl, tetrahydrothiopyranyl, tetrahydropyrimidinyl, tetrahydrothiophenyl, tetrahydrothiopyranyl, and the like.

The term "heterocycloalkyl", as used herein, refers to any alkyl having at least one alkyl hydrogen atom replaced with a heterocycle, such as —$CH_2$-morpholinyl, and the like.

The term "homocycle" or "cycloalkyl", as used herein, refers to any saturated or unsaturated (but not aromatic) carbocyclic ring containing from 3-7 carbon atoms, such as, but not limited to, cyclopropane, cyclobutane, cyclopentane, cyclohexane, cycloheptane, cyclohexene, and the like.

The term "alkyloxy" or "alkoxy", as used herein, refers to any alkyl moiety attached through an oxygen bridge (e.g., —O-alkyl) such as, but not limited to, methoxy, ethoxy, and the like.

The term "alkylthio" as used herein, refers to any alkyl moiety attached through a sulfur bridge (e.g., —S-alkyl) such as, but not limited to, methylthio, ethylthio, and the like.

The term "glycol ether" as used herein, includes, but is not limited to, ethylene glycol monomethyl ether, ethylene glycol monoethyl ether, ethylene glycol monopropyl ether, ethylene glycol monobutyl ether, ethylene glycol monoisopropyl ether, ethylene glycol monophenyl ether, diethylene glycol monomethyl ether, diethylene glycol monoethyl ether and triethylene glycol monobutyl ether.

Examples of salts include, but are not limited to, acid addition salts formed with inorganic acids (e.g., hydrochloric acid, hydrobromic acid, sulfuric acid, phosphoric acid, nitric acid, and the like), and salts formed with organic acids such as, but not limited to, acetic acid, oxalic acid, tartaric acid, succinic acid, malic acid, fumaric acid, maleic acid, ascorbic acid, benzoic acid, tannic acid, pamoic acid, alginic acid, polyglutamic, acid, naphthalene sulfonic acid, naphthalene disulfonic acid, and polygalacturonic acid. Salt compounds can also be administered as pharmaceutically acceptable quaternary salts known by a person skilled in the art, which specifically include the quaternary ammonium salts of the formula —NR, R', R"$^+$Z$^-$, wherein each R, R', R" is independently hydrogen, alkyl, or benzyl, and Z is a counter ion, including, but not limited to, chloride, bromide, iodide, alkoxide, toluenesulfonate, methylsulfonate, sulfonate, phosphate, or carboxylate (such as benzoate, succinate, acetate, glycolate, maleate, malate, fumarate, citrate, tartrate, ascorbate, cinnamoate, mandeloate, and diphenylacetate). Salt compounds can also be administered as pharmaceutically acceptable pyridine cation salts having a substituted or unsubstituted partial formula: wherein Z is a counter ion, including, but not limited to, chloride, bromide, iodide, alkoxide, toluenesulfonate, methylsulfonate, sulfonate, phosphate, or carboxylate (such as benzoate, succinate, acetate, glycolate, maleate, malate, fumarate, citrate, tartrate, ascorbate, cinnamoate, mandeloate, and diphenylacetate).

In an exemplary embodiment, each of $R_1$, $R_2$ and $R_3$ of Formula (I) is H or a methyl group or a combination thereof. In another exemplary embodiment, each of $R_1$, $R_2$ and $R_3$ of Formula (I) is independently a $C_2$-$C_7$ alkyl group, including, but not limited to, a $C_2$-$C_6$ alkyl group, a $C_2$-$C_5$ alkyl group, a $C_2$-$C_4$ alkyl group, a $C_2$-$C_3$ alkyl group, ethyl, n-propyl, isopropyl, n-butyl, isobutyl, n-amyl, n-hexyl and n-heptyl.

While mono- and dibasic-esters are known in the conventional art as coalescing agents (e.g., described in EP 0026982A1, EP 0026982A1, WO 2012/054317, U.S. Pat. No. 5,756,569), tri-basic esters as coalescing agents are uncommon. WO 2008/054277A1 describes a tri-ester based on glyceryl tripropanoate (glycerol and propionic acid) or trivalerin (triester of glycerol and valeric acid) or combinations of the two and is significantly smaller and structurally different from the compounds represented in Formula (I).

Each of the R and R' groups in DXE-RR' is independently a methyl group or a linear or branched $C_2$-$C_{12}$ alkyl group, a $C_2$-$C_{10}$ alkyl group, a $C_2$-$C_8$ alkyl group, a $C_2$-$C_6$ alkyl group, a $C_2$-$C_4$ alkyl group or a $C_2$-$C_3$ alkyl group that includes, but is not limited to, ethyl, n-propyl, isopropyl, n-butyl, isobutyl, n-amyl or n-hexyl. U.S. 2012-095145, WO 2012/173679 A1, WO 2009/097142 and EP 2247566 A2 are exemplary of descriptions of esters of $C_{3-5}$ dibasic acids which are similar to DXE-RR'.

The aforementioned (IA)/(IIA), (IA)/(IIB), (IB)/(IIA) and (IB)/(IIB) blends of the invention typically contain (by weight of the blend) from about 10% to about 70% by weight of the DXE-RR' component (where DXE-RR' is representative of the (IIA) or (IIB) compound), such as about 10% to about 60%, such as about 15% to about 50%, such as about 15% to about 45%, such as about 15% to about 35%, such as about 20% to about 30%.

In an exemplary embodiment of the invention, the coalescing composition of the invention comprising or consisting of Formula (IA) or a combination of Formula (IA) with Formula (IIA) or a combination of Formula (IA) with Formula (IIB) or a combination of Formula (IB) with Formula (IIA) forms blends with one or more known commercially available coalescing agents. Specific examples of such conventional coalescing agents include, but are not limited to, Myrifilm® (EP 2721100A1 and WO 2012/173679 succinic acid-based esters, available from Myriant), VELTA® 262 (isodecyl benzoate, available from Velsicol Chemical Corporation), VELTA® 368 (2-ethylhexyl benzoate, available from Velsicol Chemical Corporation) and ester-alcohols (e.g., TEXANOL™ (2,2,4-trimethyl-1,3-pentanediol monoisobutyrate, available from Eastman)). Additionally, the blends may include one or more solvent-based coalescing agents which exhibit a dual functionality, with examples including, but not limited to, glycol ethers (e.g., diethylene glycol monomethyl ether acetate, diethylene glycol monobutylether acetate and butyl sorbitol acetate) and any combination of glycol ethers. Specific commercial examples of such glycol ethers include, for example, the DOWANOL™ E- and P-series, DOWANOL™ PnP (propylene glycol n-propyl ether) (Dow) and Butyl CELLOSOLVE™, CARBITOL™, PROGLYDE™ and ECOSOFT™ glycol ethers (Dow).

In an exemplary embodiment of the invention, the plasticizing composition of the invention comprising or consisting of a combination of a compound of Formula (IB) with a compound of Formula (IIB) forms blends with one or more known commercially available plasticizing agents.

The coating formulations prepared from the coalescing and/or plasticizing compositions of the invention may optionally contain one or more pigments. Such formulations may also contain one or more conventional additives present in conventional coating formulations. These additives include pigment extenders, colorants, tints, dyes, dispersants, defoamers, surface active agents, opacifiers, stabilizers, biocides, suspension additive-like thickeners and protective colloids.

In pigmented systems, typical coating compositions contain from about 15 to about 90% by weight latex polymer solids, from, for example, 100% acrylics or acrylic copolymers and/or a styrene-acrylic and/or alkyds and/or vinyl polymers; from about 5 to about 50% by weight additives; and a coalescing and/or plasticizing agent in the range of 1 to 60% by weight, wherein in an exemplary embodiment, the amount of the coalescing agents of Formula (I) ranges from 3% to 20% based on the weight of dry polymer, e.g., acrylic copolymers and homopolymers, styrene-acrylic copolymers, vinyl acrylics, vinyl versatate, vinyl chloride copolymers and vinyls such as PVC.

Exemplary latex polymer solids include reaction products of one or more ethylenically unsaturated monomers, which include, but are not limited to, partially water soluble homopolymers or copolymers of styrene and acrylics. Examples of these homo- and co-polymers, such as in partial salt form, include esters of acrylic or methacrylic acid, such as methyl methacrylate, ethyl acrylate, butyl acrylate and/or methacrylate, 2-ethyl hexyl acrylate, hydroxyethyl acrylate, hydroxyethyl methacrylate, hydroxybutyl acrylate, diacetone acrylamide, acrylamide, dimethylaminoethyl methacrylate, methacrylamide, methylol methacrylamide, styrene, α-methyl styrene, styrene-butadiene, allyl methacrylate, and mixtures thereof. Other suitable binders include vinyl chloride, vinylidene chloride, vinyl versatate copolymer, vinyl alcohol, vinyl acetate, vinyl toluene, vinyl acetate, vinyl propionate and the like.

Latex polymers are well known in the art of coating compositions and it is not intended that the use of the term as described herein be particularly limiting, although some latex emulsion polymers may be better suited as coating compositions, either inherently or in combination with the coalescing agents of the invention. Examples of commercial latex emulsion polymers useful in combination with the invention include, but are not limited to, Rhoplex SG-30, Rhoplex AC-264, Rhoplex HG-706, Rhoplex AC-2508, Maincote PR71 (Dow), Acronal 296D and Styrofan ND 593 (BASF Corp.), Aquamac 705 and Aquamac 588 (Hexion Specialty Chemicals), and the like. These latex polymers may be stabilized with an alkali-soluble polymer. Alkali-soluble polymers may be prepared by making a polymer with acrylic or methacrylic acid or other polymerizable acid monomer and solubilizing the polymer by addition of ammonia or other bases.

Alkyd resins generally refer to fatty acid-modified and oil-modified polyesters. Suitable alkyd resins include, but are not limited to, polyesters as listed above that are modified with a fatty acid or oil. Suitable alkyd resins may also include, but are not limited to, aliphatic-, cycloaliphatic- or aromatic-modified resins and combinations thereof.

Suitable fillers for inclusion in the coating compositions as described herein include organic or inorganic-based pigments and minerals or a combination thereof. Specific examples of suitable fillers include, but are not limited to, titanium oxide in both the anastase and rutile forms; clay or Pyrophyllite (aluminum silicate); Wollastonite (calcium silicate); calcium carbonate in both the ground and precipitated forms; aluminum oxide; silica (silicon dioxide); magnesium oxide; talc (magnesium silicate); barytes-natural barite & blanc fixe (barium sulfate); mica; zinc oxide; zinc sulfite; sodium oxide; potassium oxide; and the like; and any combination thereof. One skilled in the art knows to choose these fillers in coating compositions based on certain characteristics such as oil absorption, brightness, pH, chemical inertness, refractive index, purity, particle size, distribution, shape and aspect ratio.

The compositions of the present invention may be applied by a plurality of methods known in the art including, but not limited to, brushing, spraying, rolling, dipping, flow coating, etc., to form films having a dry thickness in a range from about 0.1 to about 10 mils, such as about 0.5 to 5 mils, such as about 0.5 to 3 mils, such as about 1 to 3 mils.

In exemplary embodiments, the coalescing and/or plasticizing compositions of the invention may be independently tailored to achieve a particular set of final coating properties. Examples of such final coating properties include, but are not limited to, thickness; durability; flexibility; toughness; opaqueness or hiding effectiveness; gloss level (e.g., matte, eggshell, semi-gloss or gloss); tackiness; block resistance; pigment brilliance; odor and hydrophobicity.

In exemplary embodiments, a coalescing and/or plasticizing composition of the invention provides a coating with greater hiding power, higher hardness, increased block resistance, low odor, decreased dirt pickup or any combination thereof.

The embodiments of the coalescing and/or plasticizing compositions of the invention described herein have primarily referred to coating formulations, the same embodiments can be extended to specific applications including, but not limited to, paints (e.g., interior paints, roof paints, exterior paints, craft paints, traffic paints and the like); adhesives; inks; toners; caulks; sealants; stains; glazes and primers.

To facilitate a better understanding of the present invention, the following exemplary embodiments are described below.

EXAMPLES

The following examples are merely illustrative of particular embodiments of the invention and contain comparisons of compositions and methods according to the invention with the prior art and/or embodiments outside the scope of the invention. The following examples are not meant to limit the scope and breadth of the present invention.

Method for Preparation of the Compounds of Formulae (IA), (IB), (IIA) and (IIB)

The compounds of Formulae (IA), (IB), (IIA) and (IIB) are generally known and may be purchased from commercial chemical vendors or prepared by any of the methods described in the prior art. See, e.g., Sigma-Aldrich; J. Org. Chem. 30, 1351-56 (1965); Agric. Biol Chem. 1, 57-62 (1981); J. Org. Chem. 60, 6872-82 (1995); and Syn. Commun. 25, 245-52 (1995).

Measurement Procedures

Approximately 3 to 20% by weight (such as 3 to 15%, such as 5 to 15%, such as 3 to 10%, such as 5 to 10%) of a coalescing composition comprising a compound of Formula (IA), optionally in combination with varying amounts of a compound of Formula (IIA) or (IIB) or a compound of Formula (IB) in combination with varying amounts of a compound of Formula (IIA), was added to a polymer dispersion with stirring. After an aging time of 1-3 hours, the polymer dispersion mixture was applied to zinc phosphate-treated steel panels by drawdown blade to a dry film thickness of approximately 3 mils. After drying (at 20° C. for about 24 hours), the resulting films were evaluated using a variety of test methods. The viscosity of each formulation was tested using a Thomas Stormer viscometer. In addition, viscosity and rheological behavior were tested using a Brookfield DVE viscometer with a #5 spindle. All viscosity measurements were conducted at a constant temperature of 25° C. and presented in Krebs unit (KU) or CPS. The % VOC of the coalescing composition was determined by ASTM D-2369 testing. Dry film gloss and contrast ratios were measured in triplicate on drawdown films applied over Leneta opacity charts in a wet film thickness of approximately 7 mils. Gloss measurements were taken using a BYK-Gardner Tri-Gloss gloss meter at 25° C., 60° C. and 85° C. The contrast ratio was determined using a handheld data color colorimeter. Sag and leveling draw-downs were made on Leneta opacity charts and visually analyzed after 24 hours of drying at room temperature (R.T.). Block testing was performed according to ASTM D4946 and rated on a scale of 0-10, where 0 is a complete fail and 10 is a perfect pass. Hydrolytic testing was performed using a hot box in which the paint formulation was kept at 140° F. and both pH and viscosity were monitored periodically every two days during a fourteen day long study. Each sample's viscosity and pH were measured at 25° C. each time they were taken out between a two day interval period from the hot box and after measurement they were again allowed to continue aging in the hot box. The results are shown in Table 8.

For coating performance testing, the following ASTM methods, substrates and thickness as applicable were used:

Stormer Viscosity, ASTM D562

Brookfield Viscosity, ASTM D2196 pH, ASTM E70

Dry Times, ASTM D1640 (circular recorder), Single Pane Glass/3 mils

Low Temp. Coalescence 24 hr. @ temperature of 40° F., Sealed Leneta Chart/3 mils Specular Gloss, ASTM D523, Sealed Leneta Chart/3 mils Hardness, ASTM D3363, Zn phosphate treated steel/2 mils Contrast Ratio, ASTM D2805, Sealed Leneta Chart/3 mils Sag Resistance, ASTM D4400, Sealed Leneta Chart Flow and Leveling, ASTM D2801 (Scale 0=worst, 10=best), Sealed Leneta Chart Block Resistance, ASTM D4946, Sealed Leneta Chart/3 mils The efficiency of the coalescing composition was determined by determining the amount of the coalescing composition required to reduce the MFFT of a latex polymer to 40° F. (4.4° C.), which is the lowest desirable application temperature of a paint and the degree of compatibility between the coalescing composition and the polymer dispersion which typically affects the clarity of the coatings.

It is generally considered unacceptable if the amount of the coalescing agent present in a paint formulation exceeds 25% by weight based on the solids of the latex polymer, particularly for a non-volatile coalescing agent, since the coalescing agent will remain in the dried film and thus have a detrimental effect on the coating properties such as, for example, hardness, scrub resistance, and block resistance. In coatings, acrylics are most commonly applied as binders and thus one objective of the present invention is to demonstrate the versatility of the coalescing compositions of the invention in forming blends with conventional coalescing agents. In an exemplary embodiment, a styrene-acrylic emulsion has a relatively high coalescing agent demand of 15-20% on polymer solids with a typical VOC of approximately 200 g/L in a primer. A change to a near-zero VOC coalescing agent would allow formulators to achieve VOC levels of 0-100 g/L, thus effectively extending the life of this conventional styrene-acrylic.

A self-crosslinking acrylic was designed to assist formulators in lowering the coalescing agent demand. These coatings were suitable for formulation with 0-100 g/L with Texanol™ because of the addition of the low-VOC coalescing compositions of the present invention which resulted in the preparation of a coating with a near zero-VOC coating composition.

TABLE 1

VOC (%) of coalescing agents

| Coalescing Solvent | % VOC |
|---|---|
| Eastman Optifilm ™ enhancer 400 | 0.70 |
| HTCE-$R_A$ | 9.89 |
| 90:10 wt. % Blend of HTCE-$R_A$ and DXE-$R_B$ | 18.9 |
| 80:20 wt. % Blend of HTCE-$R_A$ and DXE-$R_B$ | 27.8 |

TABLE 1-continued

VOC (%) of coalescing agents

| Coalescing Solvent | % VOC |
|---|---|
| 70:30 wt. % Blend of HTCE-$R_A$ and DXE-$R_B$ | 43.5 |
| 50:50 wt. % Blend of HTCE-$R_A$ and DXE-$R_B$ | 50.0 |
| Texanol ™ | 100.0 |

HTCE-$R_A$ is Formula (IA) where $R_1$, $R_2$ and $R_3$ are each methyl.
DXE-$R_B$ is Formulation (IIA) where $R_4$ and $R_5$ are each methyl and X is —$(CH_2)_2$—, —$(CH_2)_3$— or —$(CH_2)_4$—.

As shown in Table 1, the evaluation was based on the weight loss of a 0.5 g sample after the test exposure for 60 min at 110° C. The portion of the sample lost during the test is considered volatile content and its weight ratio was determined. It can be clearly seen that both HTCE-$R_A$ by itself and blend of HTCE-$R_A$ and DXE-$R_B$ exhibit much lower VOC levels compared to Texanol™.

The following data is shown to compare clear coatings dried at room temperature and at a low temperature cure (40° F.). Properties evaluated included: surface tack, film clarity, cracking, and gloss of films dried for 24 hours. As shown in the following Examples 1 to 3, the coalescing compositions were capable of reducing the MFFT and producing clear films that demonstrated excellent coalescing characteristics associated with a low-VOC coating. In particular, clear coating formulations were prepared using coalescing compositions of the present invention and their comparison to Texanol™. The coating formulations were prepared to a final composition (parts by weight) as outlined in Examples 1 and 2, and Tables 2 and 3. Further, several corresponding properties of a coating formed from the coating compositions are also provided in Tables 2 and 3.

Example 1

This example demonstrates that the HTCE-$R_1R_2R_3$-based coalescing agent composition performs equally or superior to a conventional coalescing agent (Texanol™) in terms of coalescing properties, clarity and yet contributed very low-VOCs to the total VOC of the formulation. Example F-5 in Table 2 shows that the HTCE-$R_A$ was superior to Texanol™ in terms of a low temperature film that exhibits no cracking, which is indicative of a good minimum film forming temperature (MFFT) characteristic along with superior gloss. The film dry time indicative of surface tack was also at par which makes HTCE-$R_A$ a superior choice for this type of coating formulation.

TABLE 2

Evaluation of 4 wt. % coalescing agent composition levels with Rhoplex SG-30 ($T_g$ = approximately 20° C)

| Materials | CONTROL (No coalescing agent) | F-4 | F-5 |
|---|---|---|---|
| Rhoplex SG-30 (100% Acrylic Emulsion) | 127.5 | 125.0 | 125.0 |
| DeeFo PI-4 concentrate (Defoamer) | 0.3 | 0.3 | 0.3 |
| Deionized Water | 25.0 | 25.0 | 25.0 |
| Texanol ™ | — | 2.5 | — |
| HTCE-$R_A$ | — | — | 2.5 |
| Total formulation Weight (g) | 152.8 | 152.8 | 152.8 |
| VOC (g/L) | | 43.1 | 4.29 |
| Properties | | | |
| Surface Tack (48 hrs.) | | | |
| R.T. | None | None | None |
| 40° F. | None | None | None |
| Film Clarity | | | |
| R.T. | Excellent | Excellent | Excellent |
| 40° F. | Good | Excellent | Excellent |
| Cracking | | | |
| R.T. | None | None | None |
| 40° F. | Severe | Very Sl. | None |
| 60° Specular Gloss | | | |
| R.T | 87.0 | 89.6 | 90.0 |
| 40° F. | — | 89.1 | 90.7 |
| 20° Specular Gloss | | | |
| R.T | 75.3 | 76.6 | 75.7 |
| 40° F. | — | 74.4 | 78.1 |

HTCE-$R_A$ is Formula (IA) where $R_1$, $R_2$ and $R_3$ are each methyl.

Example 2

In this example, a 100% acrylic emulsion was chosen to demonstrate the effectiveness of the coalescing agent compositions of the invention. The results in Table 3 show that HTCE-$R_A$ (F-8) exhibited a similar performance to 100% VOC Texanol™ (F-7) with the exception of dry time or film tackiness. These deficiencies were improved with Example F-11, wherein a 50:50 wt. % blend of HTCE-$R_A$/DXE-$R_B$ demonstrates that the coalescing agent compositions of the invention are able to address the inadequacies present in conventional coalescing agents and resulted in very low-VOCs coatings which were superior to coatings prepared from 100% VOC Texanol™.

TABLE 3

Evaluation of 3.5 wt. % coalescing agent composition levels with Rhoplex AC-264.

| Materials | CONTROL (No coalescing agent) | F-7 | F-8 | F-10 | F-11 |
|---|---|---|---|---|---|
| Rhoplex AC-264 (100% Acrylic Emulsion) | 122.10 | 100.00 | 100.00 | 100.00 | 100.00 |
| DeeFo PI-4 concentrate (Defoamer) | 0.24 | 0.24 | 0.24 | 0.24 | 0.24 |
| Deionized Water | 22.00 | 20.00 | 20.00 | 20.00 | 20.00 |
| Texanol ™ | — | 2.10 | — | — | — |

TABLE 3-continued

Evaluation of 3.5 wt. % coalescing agent composition levels with Rhoplex AC-264.

| | CONTROL (No coalescing agent) | F-7 | F-8 | F-10 | F-11 |
|---|---|---|---|---|---|
| HTCE-$R_A$ | — | — | 2.10 | — | — |
| 80:20 wt. % Blend of HTCE-$R_A$/DXE-$R_B$ | — | — | — | 2.10 | — |
| 50:50 wt. % Blend of HTCE-$R_A$/DXE-$R_B$ | — | — | — | — | 2.10 |
| Total formulation Weight (g) | 122.34 | 122.34 | 122.34 | 122.34 | 122.34 |
| VOC (g/L) | | 37.2 | 3.71 | 10.4 | 20.5 |
| Properties | | | | | |
| Surface Tack (48 hrs.) | | | | | |
| R.T. | None | Slight | Moderate | Moderate | Slight |
| 40° F. LTC | None | Slight | Moderate | Moderate | Slight |
| Film Clarity | | | | | |
| R.T. | Excellent | Excellent | Excellent | Excellent | Excellent |
| 40° F. LTC | — | Excellent | Excellent | Excellent | Excellent |
| Cracking | | | | | |
| R.T. | None | None | None | None | None |
| 40° F. LTC | Severe | None | None | None | None |
| 60° Specular Gloss | — | | | | |
| R.T | 84.9 | 86.7 | 86.9 | 87.3 | 86.2 |
| 40° F. LTC | — | 83.5 | 85.2 | 86.9 | 86.3 |
| 20° Specular Gloss | | | | | |
| R.T | 68.9 | 71.3 | 70.6 | 73.7 | 65.5 |
| 40° F. LTC | — | 66.1 | 68.6 | 70.3 | 70.2 |

HTCE-$R_A$ is Formula (IA) where $R_1$, $R_2$ and $R_3$ are each methyl.
DXE-$R_B$ is Formulation (IIA) where $R_4$ and $R_5$ are each methyl and X is —$(CH_2)_2$—, —$(CH_2)_3$— or —$(CH_2)_4$—.

Example 3

In this example, a self-cross-linking binder/resin (Rhoplex HG-706)-based formulation is used. Rhoplex HG-706 is a 100% acrylic emulsion designed for interior and exterior VOC-compliant gloss and semi-gloss enamels, to produce high performance coatings at 50 g/L VOC. By design, this binder does not require the presence of any low-VOC coalescing agent, but undesirably the binder does not perform at low temperatures. Table 4 demonstrates that HTCE-$R_A$(F-2) endows the binder with excellent MFFT characteristics at 40° F. with superior gloss properties compared to Texanol™ (F-1) without undesirably enhancing any VOC characteristics (unlike Texan™).

TABLE 4

Evaluation of 3.0 wt. % coalescing agent composition levels with Rhoplex HG-706.

| Material | CONTROL (No coalescing agent) | F-1 | F-2 |
|---|---|---|---|
| Rhoplex HG-706 (Self-Crosslinking Acrylic Emulsion) | 101.35 | 100.00 | 100.00 |
| DeeFo PI-4 concentrate (Defoamer) | 0.24 | 0.24 | 0.24 |

TABLE 4-continued

Evaluation of 3.0 wt. % coalescing agent composition levels with Rhoplex HG-706.

| | CONTROL (No coalescing agent) | F-1 | F-2 |
|---|---|---|---|
| Deionized Water | 20.00 | 20.00 | 20.00 |
| Texanol ™ | — | 1.35 | — |
| HTCE-$R_A$ | — | — | 1.35 |
| Total formulation Weight (g) | 121.59 | 121.59 | 121.59 |
| VOC (g/L) | 0.0 | 33.4 | 3.30 |
| Properties | | | |
| Surface Tack (48 hrs.) | | | |
| R.T | None | None | None |
| 40° F. | — | V. Slight | V. Slight |
| Film Clarity | | | |
| R.T | Excellent | Excellent | Excellent |
| 40° F. | — | V. Good | V. Good |
| Cracking | | | |
| R.T | None | None | None |
| 40° F. | Severe | None | None |
| 60° Specular Gloss | | | |
| R.T | 86.7 | 86.7 | 87.9 |
| 40° F. | — | 84.2 | 85.4 |
| 20° Specular Gloss | | | |
| R.T | 64.4 | 71.2 | 75.1 |
| 40° F. | — | 68.1 | 72.6 |

HTCE-$R_A$ is Formula (IA) where $R_1$, $R_2$ and $R_3$ are each methyl.

Example 4

In this example, a styrene-acrylic emulsion is used to demonstrate the versatility of HTCE-$R_A$ (F-8) in extending its applicability beyond just 100% acrylic emulsions as shown in Table 5.

TABLE 5

Evaluation of 16 wt. % coalescing composition levels with Maincote PR-71 (Tg = approx. 25° C.)

| Material | CONTROL (No coalescing agent) | F-7 | F-8 |
|---|---|---|---|
| Maincote PR-71 (Styrene-Acrylic Emulsion) | 107.65 | 100.00 | 100.00 |
| DeeFo PI-4 concentrate (Defoamer) | 0.24 | 0.24 | 0.24 |
| Deionized Water | 20.00 | 20.00 | 20.00 |
| Propylene Glycol n-Propyl Ether, PNP | — | 7.65 | — |
| 80:20 wt. % Blend of HTCE-$R_A$/DXE-$R_B$ | — | — | 7.65 |
| Total formulation Weight (g) | 127.89 | 127.89 | 127.89 |
| VOC (g/L) | 0 | 146.9 | 42.60 |
| Properties | | | |
| Surface Tack (48 hrs.) | | | |
| R.T | None | V. Slight | Severe |
| Film Clarity | | | |
| R.T | Severe Haze | Excellent | Very Good |
| Cracking | | | |
| R.T | Severe | None | Moderate |
| 60° Specular Gloss | | | |
| R.T | 90.6 | 92.0 | 91.4 |
| 20° Specular Gloss | | | |
| R.T | 77.4 | 73.7 | 66.3 |

HTCE-$R_A$ is Formula (IA) where $R_1$, $R_2$ and $R_3$ are each methyl.
DXE-$R_B$ is Formulation (IIA) where $R_4$ and $R_5$ are each methyl and X is —$(CH_2)_2$—, —$(CH_2)_3$— or —$(CH_2)_4$—.

The above example was used to demonstrate the compatibility of HTCE-$R_A$ as not only a coalescing aid but also as a solvent. Traditionally, glycol ethers (such as ethylene glycol ethyl ether, ethylene glycol propyl ether, ethylene glycol butyl ether, propylene glycol mono-propyl ether and like) as film forming agents are used at high concentrations in high glass transition hard resins for industrial applications. Glycol ethers are considered to be highly volatile (i.e., 100% VOC) and typically give rise to undesirable dry time and wet-edge issues. Formulation F-8 in Table 5 demonstrates a 80:20 wt. % blend of HTCE-$R_A$/DXE-$R_B$ as a potential alternative to glycol ether (Formulation F-7) as a coalescing agent with a lower VOC content and avoidance of any wet-edge issues which is evident by the surface tack properties when compared to glycol ether.

Example 5

In this example, six samples (F9 through F14 in Table 6 below) were prepared for testing in a white interior semi-gloss formulation based on a Rhoplex SG-30 acrylic emulsion where the coalescing agent composition was varied. The results in Table 7 associated with F9 through F14 demonstrate the effectiveness of the coalescing agent compositions of the invention in unexpectedly achieving a superior coating formulation.

TABLE 6

Various 5.00 wt. % coalescing agent compositions in acrylic coating formulations

| | F9 | | F10 | | F11 | | F12 | | F13 | | F14 | |
|---|---|---|---|---|---|---|---|---|---|---|---|---|
| | Pounds | Gallons | Pounds | Gallons | Pounds | Gallons | Pounds | Gallons | Pounds | Gallons | Pounds | Gallons |
| Materials | | | | | | | | | | | | |
| Water | 150.2 | 18.03 | 150.2 | 18.03 | 150.2 | 18.03 | 150.2 | 18.03 | 150.2 | 18.03 | 150.2 | 18.03 |
| Propylene Glycol | 34.6 | 4 | 34.6 | 4 | 34.6 | 4 | 34.6 | 4 | 34.6 | 4 | 34.6 | 4 |
| Tamol 731A Pigment Dispersant | 6 | 0.65 | 6 | 0.65 | 6 | 0.65 | 6 | 0.65 | 6 | 0.65 | 6 | 0.65 |
| Triton CF-10 | 1 | 0.11 | 1 | 0.11 | 1 | 0.11 | 1 | 0.11 | 1 | 0.11 | 1 | 0.11 |
| BYK 022 Defoamer | 1 | 0.12 | 1 | 0.12 | 1 | 0.12 | 1 | 0.12 | 1 | 0.12 | 1 | 0.12 |
| Ti-Pure R-706 Rutile Titanium Dioxide | 250 | 7.54 | 250 | 7.54 | 250 | 7.54 | 250 | 7.54 | 250 | 7.54 | 250 | 7.54 |
| ** High Speed Disperse to a Texture of 7-8 N.S., then add: ** | | | | | | | | | | | | |
| Rhoplex SG-30 Acrylic Emulsion | 501.4 | 56.75 | 501.4 | 56.75 | 501.4 | 56.75 | 501.4 | 56.75 | 501.4 | 56.75 | 501.4 | 56.75 |
| Texanol™ | 12.5 | 1.61 | — | — | — | — | — | — | — | — | — | — |
| HTCE-$R_A$ | — | — | 12.5 | 1.35 | — | — | — | — | — | — | — | — |
| HTCE-$R_A$/Texanol™ | — | — | — | — | 12.5 | 1.35 | — | — | — | — | — | — |
| 50:50 HTCE-$R_A$/Texanol™ (8.53 wt/gal) | — | — | — | — | — | — | 12.5 | 1.46 | — | — | — | — |
| 30:70 HTCE-$R_A$/Texanol™ (8.27 wt/gal) | — | — | — | — | — | — | — | — | 12.5 | 1.51 | — | — |
| 50:50 HTCE-$R_A$/OptiFilm 300 (8.46 wt/gal) | — | — | — | — | — | — | — | — | — | — | 12.5 | 1.48 |

TABLE 6-continued

Various 5.00 wt. % coalescing agent compositions in acrylic coating formulations

| | F9 | | F10 | | F11 | | F12 | | F13 | | F14 | |
|---|---|---|---|---|---|---|---|---|---|---|---|---|
| | Pounds | Gallons | Pounds | Gallons | Pounds | Gallons | Pounds | Gallons | Pounds | Gallons | Pounds | Gallons |
| Aerosol OT-75 | 1.5 | 0.16 | 1.5 | 0.16 | 1.5 | 0.16 | 1.5 | 0.16 | 1.5 | 0.16 | 1.5 | 0.16 |
| BYK 022 Defoamer | 1 | 0.12 | 1 | 0.12 | 1 | 0.12 | 1 | 0.12 | 1 | 0.12 | 1 | 0.12 |
| 28% Ammonium Hydroxide | 1 | 0.13 | 1 | 0.13 | 1 | 0.13 | 1 | 0.13 | 1 | 0.13 | 1 | 0.13 |
| Acrysol RM-2020 NPR Thickener | 17.3 | 2 | 17.3 | 2 | 17.3 | 2 | 17.3 | 2 | 17.3 | 2 | 17.3 | 2 |
| Acrysol SCT-275 Thickener | 13.3 | 1.55 | 13.3 | 1.55 | 13.3 | 1.55 | 13.3 | 1.55 | 13.3 | 1.55 | 13.3 | 1.55 |
| Water | 60.2 | 7.23 | 62.5 | 7.49 | 62.5 | 7.49 | 60.6 | 7.28 | 61.1 | 7.33 | 60.5 | 7.26 |
| Total | 1051 | 100 | 1053.3 | 100 | 1053.3 | 100 | 1051.4 | 100 | 1051.9 | 100 | 1051.3 | 100 |
| Properties | | | | | | | | | | | | |
| Total Weight Solids | 48.87% without Texanol ™ | | 48.62% without HTCE-$R_A$ | | 48.62% without HTCE-$R_A$/ DXE-$R_B$ | | 48.71% without 50:50 HTCE-$R_A$/ Texanol ™ | | 48.68% without 30:70 HTCE-$R_A$/ Texanol ™ | | 48.71% without HTCE-$R_A$/ OptiFilm 300 | |
| | 49.69% with HTCE-$R_A$ | | 49.47% with HTCE-$R_A$/ DXE-$R_B$ | | 49.25% with 50:50 HTCE-$R_A$/ Texanol ™ | | 49.01% with 30:70 HTCE-$R_A$/ Texanol ™ | | 49.24% with HTCE-$R_A$/ OptiFilm 300 | | | |
| Total Volume Solids | 35.32% without Texanol ™ | | 35.32% without HTCE-$R_A$ | | 35.32% without HTCE-$R_A$/ DXE-$R_B$ | | 35.32% without HTCE-$R_A$/ Texanol ™ | | 35.32% without 30:70 HTCE-$R_A$/ Texanol ™ | | 35.32% without HTCE-$R_A$/ OptiFilm 300 | |
| | 36.54% with HTCE-$R_A$ | | 36.29% with HTCE-$R_A$/ DXE-$R_B$ | | 35.92% with 50:50 HTCE-$R_A$/ Texanol ™ | | 35.68% with 30:70 HTCE-$R_A$/ Texanol ™ | | 35.92% with HTCE-$R_A$/ OptiFilm 300 | | | |
| PVC (%) | 22.05 | | 22.05 | | 22.05 | | 22.05 | | 22.05 | | 22.05 | |
| VOC (calculated) g/l | 147.5 | | 115.6 | | 122.2 | | 131.4 | | 138.1 | | 131.3 | |

HTCE-$R_A$ is Formula (IA) where $R_1$, $R_2$ and $R_3$ are each methyl.

TABLE 7

Evaluation of properties of white interior semi-gloss formulation based on a Rhoplex SG-30 acrylic emulsion with various coalescing agent compositions

| | F-9 | F10 | F-11 | F12 | F13 | F14 |
|---|---|---|---|---|---|---|
| PROPERTY | | | | | | |
| Total Weight Solids, % | 48.87 | 49.69 | 49.47 | 49.25 | 49.01 | 49.24 |
| Total Volume Solids, % | 35.32 | 36.54 | 36.29 | 35.92 | 35.68 | 35.92 |
| PVC, % | 22.05 | 22.05 | 22.05 | 22.05 | 22.05 | 22.05 |
| VOC (theoretical), g/l | 147.5 | 115.6 | 122.2 | 131.4 | 138.1 | 131.3 |
| VOC Reduction, % | — | 21.63 | 17.15 | 10.92 | 6.37 | 10.98 |
| Stormer Viscosity (K.U.) | 106 | 104 | 104 | 104 | 106 | 106 |
| Brookfield Viscosity (cps) | | | | | | |
| 10 rpm | 10560 | 8600 | 8920 | 9240 | 10160 | 9480 |
| 100 rpm | 3812 | 3080 | 3192 | 3364 | 3508 | 3520 |
| Thixotropic Index | 2.77 | 2.79 | 2.80 | 2.74 | 2.90 | 2.69 |
| pH | 9.60 | 9.58 | 9.54 | 9.60 | 9.61 | 9.59 |
| Dry Times (hrs) | | | | | | |
| Set-To-Touch | 0.50 | 0.60 | 0.40 | 0.50 | 0.40 | 0.30 |
| Surface-Dry | 0.70 | 0.75 | 1.10 | 1.20 | 1.10 | 0.90 |
| Zapon Tester (200 g) 24 hrs at R.T. | Pass | Pass | Pass | Pass | Pass | Pass |
| Low Temperature Coalescence (40° F.) | No cracking | No cracking | No cracking | No cracking | No cracking | No cracking |
| Specular Gloss | | | | | | |
| 85° | 96.5 | 97.9 | 97.4 | 95.9 | 96.5 | 95.7 |
| 60° | 63.6 | 70.9 | 72.3 | 70.5 | 71.0 | 70.0 |
| 20° | 27.4 | 33.8 | 38.2 | 35.5 | 36.4 | 33.3 |
| Specular Gloss 24 hours | | | | | | |
| 85° | 97.4 | 98.5 | 95.6 | 98.7 | 99.9 | 97.9 |
| 60° | 72.0 | 73.3 | 70.0 | 74.6 | 72.1 | 71.8 |
| 20° | 32.9 | 36.7 | 36.7 | 40.2 | 37.0 | 36.4 |

TABLE 7-continued

Evaluation of properties of white interior semi-gloss formulation based on a Rhoplex SG-30 acrylic emulsion with various coalescing agent compositions

|  | F-9 | F10 | F-11 | F12 | F13 | F14 |
|---|---|---|---|---|---|---|
| 240 hours |  |  |  |  |  |  |
| 85° | 97.7 | 98.5 | 95.7 | 98.3 | 98.4 | 94.4 |
| 60° | 71.0 | 74.3 | 73.0 | 72.7 | 71.4 | 71.8 |
| 20° | 36.1 | 38.5 | 39.5 | 35.0 | 36.1 | 35.0 |
| Pencil Hardness |  |  |  |  |  |  |
| 24 hours | 4B | 5B | 5B | 5B | 5B | 5B |
| 240 hours | B | 2B | B | B | 2B | 2B |
| Sag Resistance | >12 mils | >12 mils | >12 mils | >12 mils | >12 mils | >12 mils |
| Flow and Leveling | 0 | 3 | 0 | 1 | 0 | 0 |
| Block Resistance | 8 | 7 | 8 | 7 | 7 | 6 |

The results of Table 7 demonstrate that HTCE-$R_A$ performs very similar to or better than the most widely used coalescing agent, Texanol™. In particular, HTCE-$R_A$ dry time and film hardness are substantially similar to Texanol™ while achieving a greater than 20% VOC reduction, being odor free and possessing superior flow and leveling properties. In addition to the HTCE-$R_A$ standalone performance, blends of HTCE-$R_A$ with commercial products Texanol™ and Optifilm 300 exhibit similar performances where reductions in VOC and odor and superior flow and leveling properties were observed to be proportional to the HTCE-$R_A$ content.

Table 8 shows various coating compositions similar to the compositions shown in Table 6 with a minor modification of the titanium dioxide pigment grade and a lower thickeners concentration. In addition, two other representative coalescing compounds of the present invention, HTCE-$R_{iBu}$ (Formula (IA) where $R_1$, $R_2$ and $R_3$ are each isobutyl) (F18) and HTCE-$R_{Bu}$ (Formula (IA) where $R_1$, $R_2$ and $R_3$ are each n-butyl) (F19) and a 50/50 wt % blend of HTCE-$R_{Bu}$ and Texanol™ (F20) were tested along with commercially available Myrifilm™ (Myriant), Texanol™ (Eastman) and Optifilm™ Enhancer 400 (Eastman). Both the Optifilm™ Enhancer 400 and Myrifilm™ were tested because of their low VOC profile.

TABLE 8

Formulations with 5.0 wt. % of various coalescing agents in white interior semi-gloss paint

| Formulation | Texanol™ | | Myrifilm™ | | Optifilm™ Enhancer 400 | | HTCE-$R_{iBu}$ | | HTCE-$R_{Bu}$ | | 50:50 wt. % HTCE-$R_{Bu}$/Texanol™ | |
|---|---|---|---|---|---|---|---|---|---|---|---|---|
|  | F15 | | F16 | | F17 | | F18 | | F19 | | F20 | |
|  | Pounds | Gallons | Pounds | Gallons | Pounds | Gallons | Pounds | Gallons | Pounds | Gallons | Pounds | Gallons |
| Water | 150.2 | 18.03 | 150.2 | 18.03 | 150.2 | 18.03 | 150.2 | 18.03 | 150.2 | 18.03 | 150.2 | 18.03 |
| Propylene Glycol | 34.6 | 4 | 34.6 | 4 | 34.6 | 4 | 34.6 | 4 | 34.6 | 4 | 34.6 | 4 |
| Tamol 731A Pigment Dispersant | 6 | 0.65 | 6 | 0.65 | 6 | 0.65 | 6 | 0.65 | 6 | 0.65 | 6 | 0.65 |
| Triton CF-10 | 1 | 0.11 | 1 | 0.11 | 1 | 0.11 | 1 | 0.11 | 1 | 0.11 | 1 | 0.11 |
| BYK 022 Defoamer | 1 | 0.12 | 1 | 0.12 | 1 | 0.12 | 1 | 0.12 | 1 | 0.12 | 1 | 0.12 |
| Kronos 2300 Rutile Titanium Dioxide | 250 | 7.54 | 250 | 7.54 | 250 | 7.54 | 250 | 7.54 | 250 | 7.54 | 250 | 7.54 |
| High Speed Disperse to a Texture of 7-8 N.S., then add following components: | | | | | | | | | | | | |
| Rhoplex SG-30 Acrylic Emulsion | 501.4 | 56.75 | 501.4 | 56.75 | 501.4 | 56.75 | 501.4 | 56.75 | 501.4 | 56.75 | 501.4 | 56.75 |
| Texanol™ | 12.5 | 1.58 | — | — | — | — | — | — | — | — | — | — |
| Myrifilm™ | — | — | 12.5 | 1.62 | — | — | — | — | — | — | — | — |
| Optifilm™ Enhancer 400 | — | — | — | — | 12.5 | 1.55 | — | — | — | — | — | — |
| HTCE-$R_{iBu}$ | — | — | — | — | — | — | 12.5 | 1.56 | — | — | — | — |
| HTCE-$R_{Bu}$ | — | — | — | — | — | — | — | — | 12.5 | 1.52 | — | — |
| HTCE-$R_{Bu}$/Texanol™ (50:50 wt. %) | — | — | — | — | — | — | — | — | — | — | 12.5 | 1.55 |
| Aerosol OT-75 | 1.5 | 0.16 | 1.5 | 0.16 | 1.5 | 0.16 | 1.5 | 0.16 | 1.5 | 0.16 | 1.5 | 0.16 |
| BYK 022 Defoamer | 1 | 0.12 | 1 | 0.12 | 1 | 0.12 | 1 | 0.12 | 1 | 0.12 | 1 | 0.12 |
| 28% Ammonium Hydroxide | 1 | 0.13 | 1 | 0.13 | 1 | 0.13 | 1 | 0.13 | 1 | 0.13 | 1 | 0.13 |
| Acrysol RM-2020 NPR Thickener | 13.6 | 1.56 | 13.6 | 1.56 | 13.6 | 1.56 | 13.6 | 1.56 | 13.6 | 1.56 | 13.6 | 1.56 |

TABLE 8-continued

Formulations with 5.0 wt. % of various coalescing agents in white interior semi-gloss paint

| | Texanol ™ | | Myrifilm ™ | | Optifilm ™ Enhancer 400 | | HTCE-$R_{iBu}$ | | HTCE-$R_{Bu}$ | | 50:50 wt. % HTCE-$R_{Bu}$/Texanol ™ | |
|---|---|---|---|---|---|---|---|---|---|---|---|---|
| | \multicolumn{12}{c}{Formulation} |
| | F15 | | F16 | | F17 | | F18 | | F19 | | F20 | |
| | Pounds | Gallons | Pounds | Gallons | Pounds | Gallons | Pounds | Gallons | Pounds | Gallons | Pounds | Gallons |
| Acrysol SCT-275 Thickener | 9.8 | 1.14 | 9.8 | 1.14 | 9.8 | 1.14 | 9.8 | 1.14 | 9.8 | 1.14 | 9.8 | 1.14 |
| Water | 60.2 | 7.23 | 60.2 | 7.23 | 60.2 | 7.23 | 60.2 | 7.23 | 60.2 | 7.23 | 60.2 | 7.23 |
| Total | 1043.8 | 99.12 | 1043.8 | 99.16 | 1043.8 | 99.09 | 1043.8 | 99.1 | 1043.8 | 99.06 | 1043.8 | 99.09 |

HTCE-$R_{Bu}$ is Formula (IA) where $R_1$, $R_2$ and $R_3$ are each butyl.
HTCE-$R_{iBu}$ is Formula (IA) where $R_1$, $R_2$ and $R_3$ are each isobutyl.

The observed properties of the tested compositions F15 through F20 as shown in Table 8 are depicted in Table 9. The results show that Myrifilm™, exhibited the lowest block resistance and failed the tack-free time test which was done using Zapon tester. Compared to the Optifilm™ Enhancer 400 and Myrifilm™, both HTCE-$R_{iBu}$ and HTCE-$R_{Bu}$ were found to produce lower viscosities and thixotropic index similar to Texanol™ indicating good compatibility with paint formulation and close to 32% reduction in VOC over Texanol™.

TABLE 9

Properties of white interior semi-gloss paint with various coalescing agents

| PROPERTY | Texanol ™ F-15 | Myrifilm ™ F16 | Optifilm ™ Enhancer 400 F-17 | HTCE-$R_{iBu}$ F18 | HTCE-$R_{Bu}$ F19 | 50:50 wt. % HTCE-$R_{Bu}$/Texanol ™ F20 |
|---|---|---|---|---|---|---|
| Total Weight Solids, % | 48.93 | 49.85 | 50.13 | 50.05 | 50.11 | 49.31 |
| Total Volume Solids, % | 35.49 | 36.85 | 37.07 | 36.96 | 37.03 | 36.09 |
| PVC, % | 22.05 | 22.05 | 22.05 | 22.05 | 22.05 | 22.05 |
| VOC (g/l) | 147 | 113 | 110 | 112 | 110 | 129 |
| Stormer Viscosity (K.U.) | 112 | 124 | 121 | 123 | 123 | 122 |
| Brookfield Viscosity (cps) | | | | | | |
| 10 rpm | 14100 | 23500 | 23900 | 21700 | 19600 | 22100 |
| 100 rpm | 4040 | 5990 | 5700 | 5660 | 5650 | 5050 |
| Thixotropic Index | 3.49 | 3.92 | 4.19 | 3.83 | 3.47 | 4.38 |
| pH | 9.94 | 10.39 | 10 | 10.27 | 10.02 | 9.91 |
| Dry Times (hrs) | | | | | | |
| Set-To-Touch | 0.6 | 0.75 | 0.75 | 0.75 | 0.8 | 0.65 |
| Surface-Dry | 0.75 | 0.95 | 0.9 | 0.95 | 1.1 | 1 |
| Dry-Through | >12 | >12 | >12 | >12 | >12 | >12 |
| Specular Gloss (R.T.) | | | | | | |
| 24 hours | | | | | | |
| 85° | 99.6 | 98 | 99.2 | 97.7 | 97.6 | 95 |
| 60° | 71.8 | 71.3 | 71.2 | 73.6 | 74 | 68.3 |
| 20° | 35.6 | 38.9 | 42.9 | 41.3 | 42.4 | 34.9 |
| 336 hours | | | | | | |
| 85° | 99.7 | 97.8 | 97.7 | 98.2 | 98.5 | 96.7 |
| 60° | 72 | 72.2 | 74.4 | 74.1 | 73.9 | 68.2 |
| 20° | 35.9 | 39 | 42.9 | 42.6 | 43 | 33.2 |
| Low Temperature Coalescence (40° F.) | Pass: No cracking | Pass: No cracking | Pass: No cracking | Pass: No cracking | Pass: No cracking | Pass: No cracking |
| Specular Gloss (40° F.) | | | | | | |
| 85° | 101.2 | 94.4 | 98.1 | 95.1 | 97 | 97.3 |
| 60° | 74.3 | 74 | 76.9 | 77 | 74.2 | 74.1 |
| 20° | 38.9 | 48.6 | 50.3 | 49.1 | 48.8 | 44.1 |
| Pencil Hardness | | | | | | |
| 24 hours | 5B | 5B | 5B | 5B | 5B | 5B |
| 96 hours | 2B | 2B | 2B | 2B | 2B | 2B |
| 240 hours | B | 2B | 2B | 2B | 2B | 2B |

TABLE 9-continued

Properties of white interior semi-gloss paint with various coalescing agents

|  | Texanol ™ F-15 | Myrifilm ™ F16 | Optifilm ™ Enhancer 400 F-17 | HTCE-R$_{iBu}$ F18 | HTCE-R$_{Bu}$ F19 | 50:50 wt. % HTCE-R$_{Bu}$/Texanol ™ F20 |
|---|---|---|---|---|---|---|
| Contrast Ratio | 0.995 | 0.993 | 0.991 | 0.992 | 0.992 | 0.994 |
| Sag Resistance | >12 mils | >12 mils | >12 mils | >12 mils | >12 mils | >12 mils |
| Flow & Leveling | 0 | 0 | 0 | 0 | 0 | 0 |
| Zapon Tester (1 wk. cure - 200 g load-10 seconds) | Pass | Fail | Pass | Fail | Pass | Pass |
| Block Resistance | 8 | 5 | 6 | 6 | 7 | 7 |

HTCE-R$_{Bu}$ is Formula (IA) where R$_1$, R$_2$ and R$_3$ are each butyl.
HTCE-R$_{iBu}$ is Formula (IA) where R$_1$, R$_2$ and R$_3$ are each isobutyl.

It is notable that in coatings where higher concentrations, such as, for example, 8-12% of Texanol™ or other high VOC components are present, a significant amount of VOC reduction can still be achieved without compromising the viscosity and compatibility of the paint composition when HTCE-R$_{iBu}$ and HTCE-R$_{Bu}$ are also present.

Example 6

In this example, formulations F17 (Optifilm™ Enhancer 400) and F19 (HTCE-R$_{Bu}$) were tested to determine pH and viscosity variations during 140° F. periodic hot box treatment which is indicative of the hydrolytic stabilities of the coalescing agents in paint.

TABLE 10

Evaluation of pH and hydrolytic hot box stability of white interior semi-gloss paint formulations with 5 wt. % of a coalescing agent.

|  |  | Initial | 2 days | 4 days | 7 days | 9 days | 11 days | 14 days |
|---|---|---|---|---|---|---|---|---|
| Viscosity (CPS) at 100 RPM, 25° C. | Optifilm ™ Enhancer 400 | 5700 | 5640 | 5370 | 6340 | 6450 | 5160 | 4570 |
|  | HTCE-R$_{Bu}$ | 5650 | 6020 | 6010 | 6300 | 6350 | 6200 | 5940 |
| pH at 25° C. | Optifilm ™ Enhancer 400 | 10 | 10.24 | 10.19 | 9.95 | 10.03 | 9.98 | 9.95 |
|  | HTCE-R$_{Bu}$ | 10.02 | 10.27 | 10.15 | 10.04 | 9.95 | 9.89 | 9.78 |

HTCE-R$_{Bu}$ is Formula (IA) where R$_1$, R$_2$ and R$_3$ are each butyl.

The results shown in Table 10 clearly indicate that HTCE-R$_B$u is stable in terms of retaining its pH and viscosity over a two-week period subjected to hot box conditions similar to commercially used materials like Eastman's Optifilm™ Enhancer 400.

It will be understood that changes and modifications may be made in the present invention as described herein which are within the skill of the art to attain the ends and advantages mentioned. While the invention has been described and defined by reference to disclosed embodiments of the invention, such references do not imply a limitation on the invention, and no such limitation is to be further inferred. Furthermore, the depicted and described embodiments of the invention are exemplary only and are not exhaustive of the scope of the invention. Consequently, the invention is intended to be limited only by the spirit and scope as recited in the appended claims. All publications cited herein are incorporated by reference in their entireties.

The invention claimed is:

1. A low-VOC coalescing composition comprising:
a compound of Formula (IA)

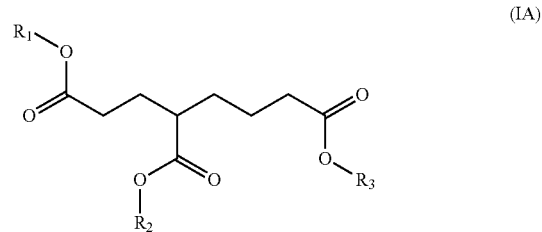

(IA)

wherein:
R$_1$, R$_2$ and R$_3$ are each independently C$_1$-C$_6$ alkyl;
and a compound of Formula (IIA)

R$_4$—OOC—X—COO—R$_5$ (IIA), wherein:
R$_4$ and R$_5$ are each independently C$_1$-C$_6$ alkyl; and X is —(CH$_2$)$_2$—, —(CH$_2$)$_3$— or —(CH$_2$)$_4$—; and
wherein the composition has ratio of Formula IA to Formula IIA from 1:9 to 9:1 by weight.

2. The composition according to claim 1, wherein R$_1$, R$_2$ and R$_3$ are each independently selected from the group consisting of methyl, ethyl, propyl, isopropyl, butyl, isobutyl, pentyl, isopentyl and hexyl.

3. The composition according to claim 1, wherein R$_4$ and R$_5$ are each independently selected from the group consisting of methyl, ethyl, propyl, isopropyl, butyl, isobutyl, pentyl, isopentyl and hexyl.

4. The composition according to claim 1, wherein both R$_4$ and R$_5$ are methyl and X is —(CH$_2$)$_2$—, —(CH$_2$)$_3$— or —(CH$_2$)$_4$—.

5. A coating composition comprising:
the low VOC coalescing composition according to claim 1; and
a binder, a pigment, a pigment extender, a colorant, a tint, a dye, a surfactant, a suspension additive, an antifoaming agent, a biocide, a fungicide, a particulate, a cementitious composition, a texturizing composition, a water-miscible solvent, a pH adjuster, a crosslinking agent, a thickening agent, a viscosifier, a filler, a freeze-thaw additive, a flattening additive, a pigment grind additive, an opacifier, a stabilizer, a film preservative or any combination thereof.

6. The coating composition according to claim 5, wherein $R_1$, $R_2$ and $R_3$ are each independently selected from the group consisting of methyl, ethyl, propyl, isopropyl, butyl, isobutyl, pentyl, isopentyl and hexyl.

7. The coating composition according to claim 5, wherein the coating composition is a paint, ink, adhesive, toner, sealant, stain, glaze, primer or carpet backing.

8. The coating composition according to claim 5, wherein the coating composition is a latex paint composition.

9. The coating composition according to claim 5, wherein the composition has a VOC level of 0-100 g/L.

* * * * *